Jan. 27, 1970 M. J. F. GAZE 3,492,179
ETCH COMPOSITION AND METHOD FOR CHROMIUM
Filed April 6, 1967
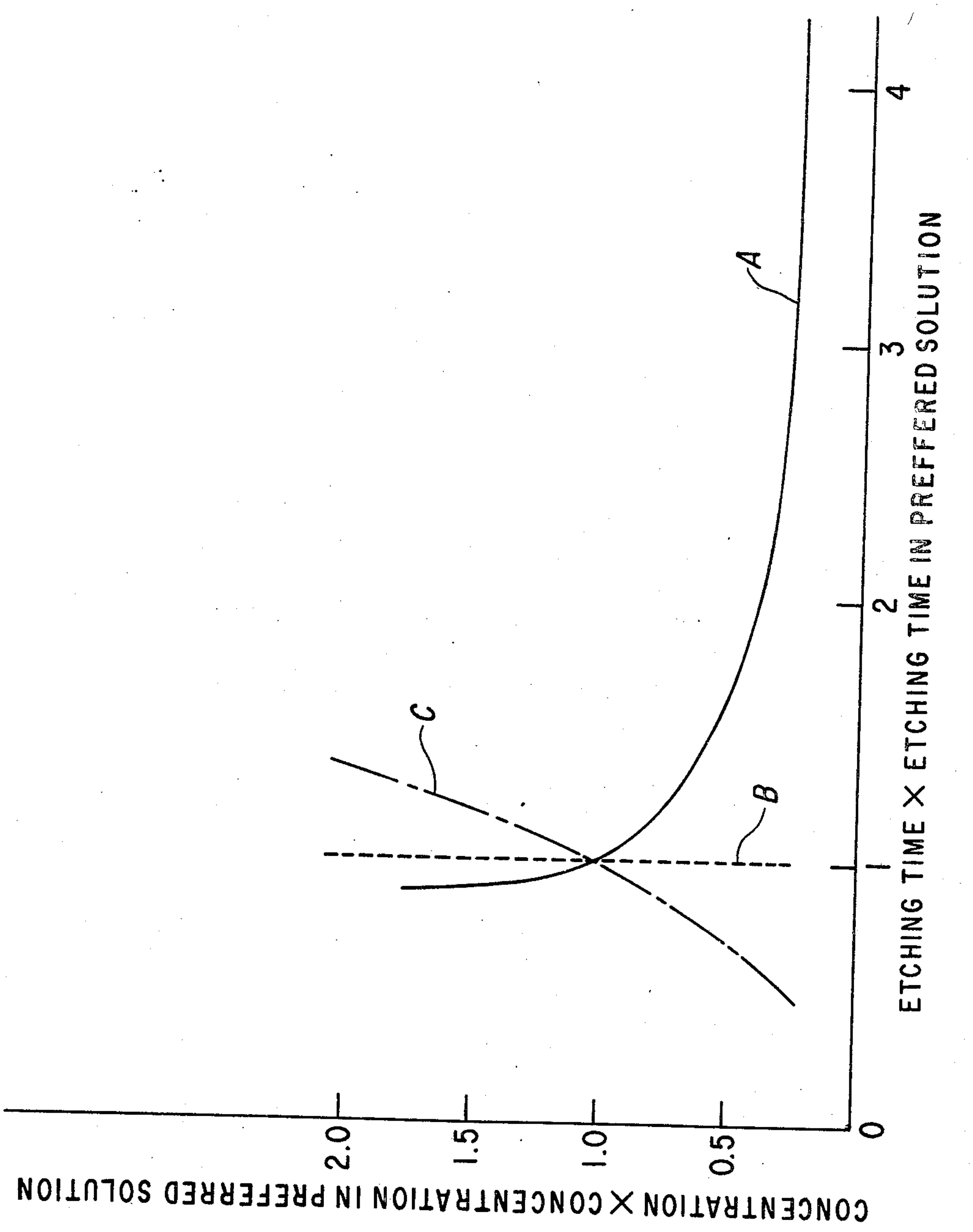
INVENTOR
Michael J. F. Gaze
BY Robert J. Crawford
ATTORNEY

United States Patent Office 3,492,179
Patented Jan. 27, 1970

3,492,179
ETCH COMPOSITION AND METHOD FOR CHROMIUM

Michael J. F. Gaze, Richardson, Tex., assignor to Texas Instruments Incorporated, Dallas, Tex., a corporation of Delaware

Filed Apr. 6, 1967, Ser. No. 628,900
Claims priority, application Great Britain, Apr. 29, 1966, 18,973/66
Int. Cl. C23f *1/00;* C23b *1/02*
U.S. Cl. 156—18 5 Claims

ABSTRACT OF THE DISCLOSURE

Disclosed are etch compositions and methods of selectively etching thin films of chromium. The composition may contain, by weight, for example, 0.8% to 9.0% ceric sulphate, 1.0% to 15.0% perchloric acid, and 2.0% to 18.0% sulphuric acid, the balance being water.

This invention relates to a composition of matter, and more particularly relates to an etch composition which is suitable for the selective etching of thin films of chromium to form micropatterns with good definition such as are required, for example, in the manufacture of chromium-on-glass photomasks for use in integrated circuit production.

The surface of an evaporated chromium film is readily oxidized to chromium sesquioxide which, being extremely insoluble, makes the etching of chromium films difficult. The formation of this chromium sesquioxide layer makes the etches which are normally used for chromium (concentrated hydrochloric acid or dilute sulphuric acid, for example) unsuitable for use on thin films: either etching does not take place, or the results vary over the surface of the film and the rate of etching is difficult to control.

Better results can be achieved by the use of more complicated etches and processes. For example, a mixture of concentrated hydrochloric acid and ferric chloride is capable of producing better results, but it is necessary to use the mixture hot. As a result, hydrogen chloride gas boiling off from the solution may cause variations in the results obtained and even render the etch inoperative.

This invention provides an etch which comprises an amount within the range of from 0.8% to 5.0% by weight of ceric sulphate, of from 1.0% to 15.0% by weight of perchloric acid and of from 2.0% to 18.0% by weight of sulphuric acid, the remainder being water and the combined weight of the perchloric acid and sulphuric acid constituents lying within the range of from 9.0% to 22.0% of the weight of the etch.

A method of etching chromium comprises, according to the invention, exposing a selected portion or portions of a chromium surface to an etch as defined in the preceding paragraph, the etch being at a temperature within the range of from 60 to 70° C. By use of this method, heavily oxidized chromium films have been etched uniformly with good definition and the etch rate can be controlled without difficulty, the etching time being dependent, inter alia, on the film thickness and the particular etch compositon.

An object of the invention is to provide a new composition of matter.

An additional object of the invention is to provide a new composition of matter particularly adapted for etching of thin films of chromium.

A further object of the invention is to provide a method for selectively etching thin films of chromium.

These and other objects and features of the invention will become apparent as the description proceeds with reference to the sole figure of the accompanying drawing.

Preferably, the combined weight of the perchloric acid and sulphuric acid constituents of the etch lie within the range of from 12% to 19% of the weight of the etch, and for most purposes the etch is further improved if the amount of ceric sulphate present is not less than 2% by weight of the etch.

Optimum results have been achieved with an etch which comprises 3% by weight of ceric sulphate, 8.5% by weight of sulphuric acid and 7% by weight of perchloric acid, the remaining amount being water. Using an etch of this preferred composition, lines three microns in width have been produced in chromium films, with good edge definition.

The drawing shows the effect on the etching time of varying the amount of either ceric sulphate, or sulphuric acid, or perchloric acid from that present in this preferred composition while keeping the amounts of the other two constituents constant at the preferred values, the variation being accompanied by a corresponding variation in the amount of water present in the etch.

In the drawing, the solid line A shows the effect on the etching time of varying (from 3% by weight) the amount of ceric sulphate present in an etch otherwise having the preferred composition, except that the amount of water is varied accordingly. The dotted line B and the broken line C show the effect of similarly varying the amount of perchloric acid and the amount of sulphuric acid respectively. The etching times of the various solutions are shown in terms of that of an etch having the preferred composition.

As shown in the drawing, it has been found that the etch becomes virtually ineffective (i.e., the etching time becomes very long) when the amount of ceric sulphate present is reduced below a quarter of that used in the preferred solution (that is, below about 0.75%) while increasing the amount above that used in the preferred solution has very little effect on the rate of etching.

It has also been found that the etching time varies inversely with the amount of sulphuric acid present in the etch. However, altering the amount of sulphuric acid produces various other results which in turn also have an effect on the properties of the etch. For example, if the amount of sulphuric acid is reduced below about a quarter of that used in the preferred solution, then the requisite quantity of ceric sulphate will not dissolve completely and the rate of etching is therefore affected. Increasing the concentration of sulphuric acid also can be disadvantageous when photo-resist is used for masking the chromium film which is to be etched, since the acid then tends to attack the mask.

Varying the amount of perchloric acid between a quarter and twice that used in the preferred solution has not been found to affect the etching time of an etch containing the preferred amounts of ceric sulphate and sulphuric acid, although, when photo-resist is used for masking, too great an amount of perchloric acid may be detrimental to the adhesion of the mask. The concentration of perchloric acid does affect the etching time if the sulphuric acid concentration is low, for example, if the amount of sulphuric acid in the etch is reduced to below a quarter of the amount in the preferred solution. It has also been found that the edge definition of an etched surface is dependent on the perchloric acid concentration and optimum results have been obtained when the concentration of perchloric acid is at the preferred value.

While the invention has been described with reference to particular embodiments and modifications, it will be evident that further modifications are possible without departing from the scope of the invention as defined in the appended claims.

What is claimed is:

1. A composition of matter comprising by weight 0.8% to 5.0% ceric sulphate, 1.0% to 15.0% perchloric acid, and 2.0% to 18.0% sulphuric acid, the remainder being water and the combined weight of the perchloric acid and sulphuric acid constituents lying within the range of from 9.0% to 22.0% of the weight of the composition.

2. A composition of matter as in claim 1 in which the combined weight of the perchloric acid and sulphuric acid constituents lies within the range of from 12.0% to 19.0% of the weight of the composition.

3. A composition of matter as in claim 1 in which the amount of ceric sulphate is not less than 2.0% by weight of the composition.

4. A composition of matter as in claim 1 wherein the percent by weight of ceric sulphate, sulphuric acid and perchloric acid is 3.0%, 8.5% and 7.0%, respectively.

5. A method of selectively etching a thin film of chromium comprising heating a composition comprising by weight 0.8% to 5.0% ceric sulphate, 1.0% to 15.0% perchloric acid, 2.0% to 18.0% sulphuric acid, and remainder water, to a temperature in the range of 60° C. to 70° C.; and exposing selected portions of said thin film to said composition for a predetermined period of time.

References Cited

UNITED STATES PATENTS 2,687,345 8/1954 Murray ---------- 156—18 XR

JACOB H. STEINBERG, Primary Examiner

U.S. Cl. X.R.

156—14; 252—79.2